July 25, 1950 W. B. BRUENE 2,516,181
HIGH-POWER AUDIO FREQUENCY AMPLIFIER
Filed May 3, 1948
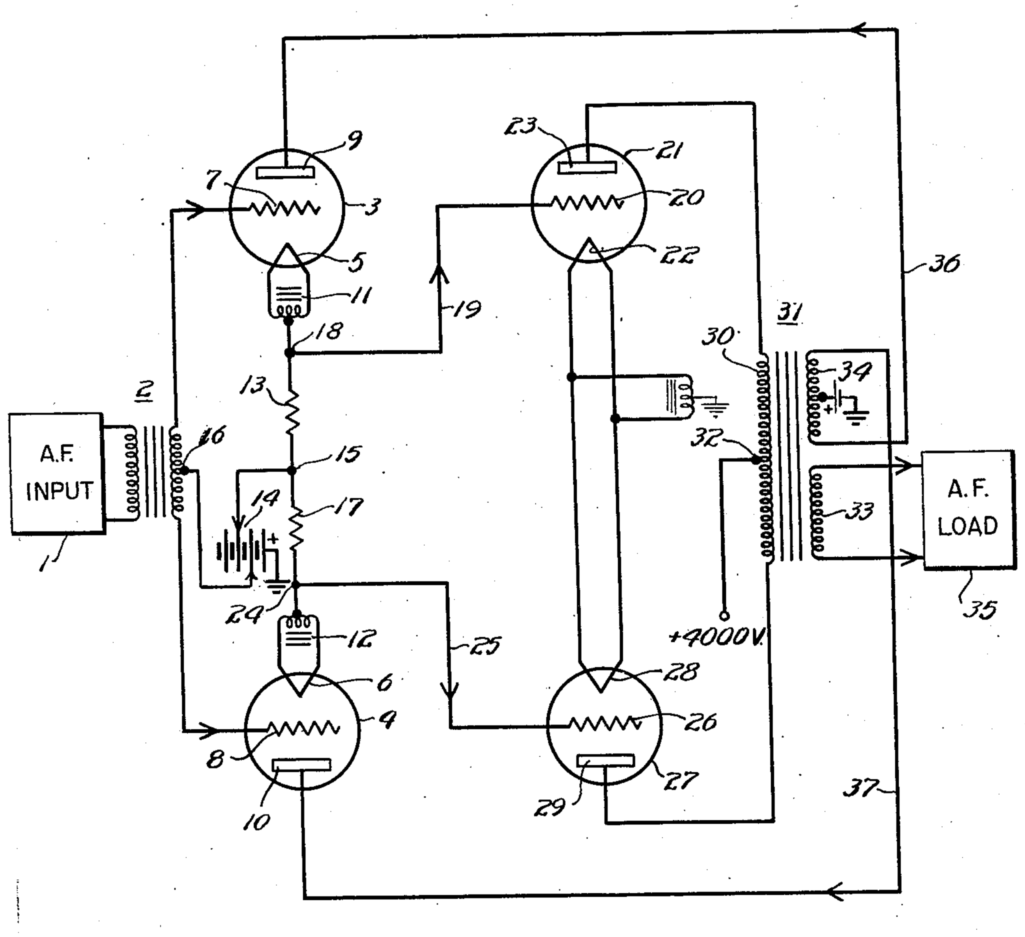
WARREN B. BRUENE
INVENTOR
BY John J. Rogan
ATTORNEY Patented July 25, 1950

2,516,181

UNITED STATES PATENT OFFICE 2,516,181

HIGH-POWER AUDIO FREQUENCY AMPLIFIER

Warren B. Bruene, Cedar Rapids, Iowa, assignor to Collins Radio Company, Cedar Rapids, Iowa, a corporation of Iowa Application May 3, 1948, Serial No. 24,835

9 Claims. (Cl. 179—171)

This invention relates to electron tube amplifiers, and more especially it relates to audio frequency amplifiers of the high power type.

A principal object of the invention is to provide an improved plural-stage high power amplifier.

Another object is to provide an improved audio frequency amplifier of the class "B" type.

A further object is to provide a class "B" amplifier with an improved input driver stage.

A feature of the invention relates to a high power audio frequency amplifier having a driver stage of the cathode follower type, in conjunction with means controlled by the amplified output for applying an audio excitation voltage to the plate of the driver stage in synchronism with the plate current peak demands of that stage.

Another feature relates to the combination of a class "B" audio frequency power amplifier stage which is excited by a driver stage of the cathode follower type having special circuit arrangements for enabling the cathode follower to supply the necessary peak power excitation for the grid circuit of the driven stage and within the normal power dissipation limits of the cathode follower tube.

A further feature relates to the novel organization, arrangement and relative interconnection of parts which cooperate to provide a more efficient high power audio frequency amplifier using a class "B" amplifier stage.

Other features and advantages not particularly enumerated, will be apparent after a consideration of the following detailed descriptions and the appended claims.

The single figure of the drawing shows in schematic form, an amplifier arrangement embodying the concept of the invention. It comprises any well-known source 1 of signals to be amplified, for example signals in the voice or audio frequency range, this source being coupled through the push-pull input transformer 2 to a pair of driver tubes 3, 4, preferably, although not necessarily, of the triode type. For example, the tubes 3, 4, may each be of the type 6B4G, having respective electron-emitting filamentary cathodes 5, 6; respective control grids, 7, 8; and respective output anodes or plates 9, 10, all the electrodes being enclosed within the usual evacuated bulb or envelope. The filaments 5, 6, are supplied with heating current from any suitable filament supply source represented by the filament transformers 11, 12. The midpoint of the secondary winding of transformer 11 is connected through a cathode load resistor 13 to a suitable negative tap 14 on a grid bias D. C. source represented schematically as a battery, and so that the point 15 is at a predetermined negative potential with respect to ground. The midpoint 16 of the secondary winding of the input transformer 2 is connected to a less negative tap on the bias source, so that grid 7 is biassed negatively with respect to cathode 5 by the proper amount. Similarly, the midpoint of filament transformer 12 is connected through cathode load resistor 17 to the point 15. The resistors 13, 17, are of equal resistance so that the grids 7, 8, are equally negatively biassed with respect to their cathodes 5, 6.

The point 18 of resistor 13 is connected by conductor 19 to the control grid 20 of a class "B" amplifier tube 21 which, for example, may be of the type 450TL, having the usual filamentary cathode 22 and the cooperating output anode or plate 23. Likewise, the point 24 of resistor 17 is connected by conductor 25 to the control grid 26 of a class "B" amplifier tube 27 of the same type as tube 21, and including the filamentary cathode 28 and cooperating output anode or plate 29. The filaments 22, 28, are supplied from any suitable heating current source as shown. The plates 23, 29, are connected in push-pull relation to the primary winding 30 of a push-pull output transformer 31 whose electrical midpoint 32 is connected to the usual high voltage D. C. plate supply source (not shown) which may, for example, be of four thousand volts.

The transformer 31 has two secondary windings 33, 34. Winding 33 is connected to any desired output or load device 35 which may, for example, be the modulating stage of a radio transmitter or the like. Winding 34 has its electrical midpoint grounded through a suitable D. C. source represented by a battery, and one end of this winding is connected by conductor 36 to plate 9, while the opposite end of the same winding is connected by conductor 37 to plate 10. The turns ratio between windings 30 and 34 is chosen so as to apply amplified audio frequency voltages of a predetermined peak value to the respective plates 9, 10, in push-pull relation. By this arrangement, the audio frequency signal voltage peaks applied to grids 7 and 8 occur in timed coincidence with the corresponding amplified audio frequency peak voltages fed back to plates 9 and 10 over conductors 36, 37.

Since the tubes 21, 27, are to operate as class "B" amplifiers, it is requisite that when the grids 20, 26, swing positively and absorb power as a result of the application thereto of the positive peaks of the audio frequency signals over conductors 19, 25, the driver tubes 3, 4, supply the necessary undistorted grid power requirements. In order that excessive flattening of the audio frequency peaks at grids 20, 26, shall not take place, the driver tubes 3, 4, are of the cathode follower type, and as is well-known, they have low output impedance. However, in many cases, it is impossible to use a tube as a cathode follower in the conventional way to drive a class "B" amplifier, because of the limitations of undistorted peak power output that may be obtained within the rated power dissipation of the cathode follower tube. Heretofore this has required the use of driver tubes of rather large output ratings.

The arrangement according to the invention, and as disclosed in the drawing, permits the use of driver tubes of much lower power rating. This is accomplished by feeding back from the output of the class "B" stage an audio frequency voltage in correct phase relationship, so that the fed-back audio frequency voltage peaks coincide with the peak demands for plate current in the driver tubes. In other words, the voltage applied to the plates of the driver tubes, varies with the signal input from source 1, and the peak demands of the cathode follower driver tubes are met, without correspondingly increasing the average power dissipation of these tubes.

In order to achieve the best results, the various bias voltages should be properly chosen. For example, if tubes 21 and 27 are of the type 450TL, they will require a normal steady grid bias on their grids 21, 26, of minus one hundred and seventy-five volts. This is obtained by using resistors 13, 17, each of a suitable value, and adjusting the tap 14 on the bias source so that there is applied a negative bias to grids 7, 8, of such a value that the points 18 and 24 are at a voltage of minus one hundred and seventy-five volts. It can be assumed that a peak audio frequency voltage of, for example, four hundred and forty volts is required on grids 20, 26, to produce full power output from the class "B" amplifier. If the grids 7, 8, are never driven positively, the maximum plate-to-filament voltage for tubes 3, 4, can be determined from the usual characteristic curves of these tubes. Thus, if the maximum plate-to-filament voltage is one hundred and twenty-five volts, and since the filaments 5, 6, must be at two hundred and sixty-five volts positive with respect to ground (that is four hundred and forty volts minus one hundred and seventy-five volts), then for the maximum plate-to-filament voltage of one hundred and twenty-five volts, a total of three hundred and ninety volts must be applied to the plates 9, 10, for the desired operation. This required plate voltage can be obtained from the specially designed winding 34 on the output transformer.

Since the voltage on the plates 9, 10, follows the audio frequency input voltage at grids 7 and 8, the system represents a regenerative feedback, so that it is necessary to limit the feedback in the feedback loop to a value less than unity. In the particular example given above, the feedback amounts to approximately twenty-one per cent, which is very well within the safe limits so that sustained oscillation is impossible. While there is some slight distortion produced by this regenerative feedback, it is more than counterbalanced by the low distortion resulting from the elimination of the usual driver transformer between the driver stage and the class "B" amplifier stage. It is further counter-balanced by the reduction of distortion in the driver stage itself. An additional advantage of the arrangement disclosed is that the regulation of the bias supply is not as critical as is ordinarily the case, because the tubes 3 and 4 have a self-compensating action. Bias adjustments on the class "B" amplifier stage are easily effected by adjusting the bias of the driver stage because of the dependence of the class "B" amplifier grid bias upon the drop in the cathode load resistors 13, 17.

There is also the advantage of the very low phase shift since no coupling transformers are used to couple the outputs of the driver stages to the inputs of the driver stages.

While the drawing shows a system employing a single pair of tubes for the push-pull driver stage, and a single pair of tubes for the class "B" amplifier stage, it will be understood that a tube similar to tube 3 may be connected with its electrodes in parallel with the corresponding electrodes of tube 3, and another tube, like tube 4, can be connected with its electrodes in parallel with the corresponding electrodes of tube 4. Likewise, tubes 21 and 27 may each have their electrodes connected in parallel with the corresponding electrodes of similar tubes.

If desired, the tubes 3, 4, may be dual grid tubes or tetrodes, whose plates can be connected to a steady plate potential, and the conductors 36 and 37 connected respectively to the second or anode grid of each tetrode.

Various changes and modifications may be made in the disclosed embodiment, without departing from the spirit and scope of the invention.

What is claimed is:

1. An amplifier arrangement, comprising a driving stage, a driven stage of the class B amplifier type, each of said stages including an electron tube having at least a cathode, an output anode and a control grid upon which input signals are impressed, a load device connected in the cathode return circuit of the driving stage, a coupling connection between said load and the control grid of said driven stage for normally biassing the control grid of said driven stage negatively with respect to its cathode, means to apply a direct current potential to the anode of the driving stage, means to superimpose on said direct current potential a pulsating current derived from the output of said driven stage, and means to apply said superimposed potentials as driving potentials to the anode of the driving stage.

2. An amplifier arrangement according to claim 1, in which the last-mentioned means includes a connection from the output of the driven stage to the anode of the driving stage to drive said anode in regenerative phase with the input signals applied to said driver stage.

3. An amplifier arrangement according to claim 1, in which said load device is a cathode load resistor connected between the cathode of the driver stage and ground, and the coupling between said cathode load and the control grid of said driven stage is a direct current connection.

4. An amplifier arrangement according to claim 1, in which the last-mentioned means comprises an output transformer for the driven stage having a main signal output secondary winding and another secondary winding connected to the anode of said driving stage.

5. A power amplifier comprising, a pair of grid-controlled driver tubes, means to apply input signals to be amplified in push-pull relation to the control grids of said driver tubes, cathode load resistors for said driver tubes, means to bias the control grids of said driver tubes negatively with respect to their cathodes, a pair of class "B" amplifier tubes each of the grid-controlled type and having their control grids driven by the cathode load variations of the respective driver tubes, a push-pull output transformer connected to the plates of said class "B" amplifier tubes, a signal output winding for said transformer, an auxiliary winding on said transformer, and means connecting said auxiliary winding in push-pull relation to the plates of said driver tubes to supply the plates with respective driving potentials in regenerative phase with the signal potentials applied to the respective control grids of said driver tubes.

6. An amplifier arrangement comprising, a pair of class "B" amplifier tubes arranged to be driven in push-pull relation, a pair of grid-controlled driver tubes connected in push-pull relation to an input signal source each of said tubes including at least a cathode, an anode and a control grid, cathode load resistors for said driver tubes said resistors having a value for applying a predetermined negative bias to the grids of said class "B" tubes, means to adjust the normal negative bias on the grids of the driver tubes to impart said negative bias to the grids of said class "B" amplifier tubes, and means coupled to the anodes of said driven tubes and to the anodes of the driver tubes to drive the anodes of said driver tubes from the amplified output of said class "B" amplifier tubes.

7. An amplifier comprising, a driver stage, a driven stage, each stage including an electron tube having at least a cathode, an anode and a control grid, a cathode load resistor for the driving stage and for applying a predetermined normal negative grid bias to the control grid of the driven stage, means to apply signal voltages to the control grid of the driver stage to drive the grid of the driven stage positively with respect to its cathode during a predetermined portion of each excitation cycle of the input signal wave, and means coupling the anodes of said driven stages to the anodes of said driving stages to drive the latter in timed coincidence with the input signal waves applied to the control grids thereof.

8. A power amplifier according to claim 7 in which means are provided for normally biassing the control grid of the driver stage sufficiently negative so that it remains negative during the entire excitation cycle of the input signal waves.

9. A power amplifier according to claim 7, in which the means for applying the operating potential to the plate of said driver stage comprises a regenerative feedback loop from the output of the driven stage to the plate of the driver stage, said loop having an overall feedback factor which is less than unity to supply said driver stage with peak power plate voltage corresponding to the peaks of the input signal waves.

WARREN B. BRUENE.

REFERENCES CITED

The following references are of record in the file of this patent:

UNITED STATES PATENTS

| Number | Name | Date |
|---|---|---|
| 1,953,775 | Robinson | Apr. 3, 1934 |
| 2,161,844 | Babler | June 13, 1939 |
| 2,273,997 | Rubin | Feb. 24, 1942 |